United States Patent
Werfel et al.

(10) Patent No.: US 6,806,604 B2
(45) Date of Patent: Oct. 19, 2004

(54) CENTRIFUGE WITH A MAGNETICALLY STABILIZED ROTOR FOR CENTRIFUGAL GOODS

(75) Inventors: Frank Werfel, Leipzig (DE); Dietmar Kopp, Einbeck (DE); Viktor Betke, Hannover (DE); Ingo Jaeckel, Badenhausen (DE); Uta Flögel-Delor, Pflückuff/Losswig (DE)

(73) Assignees: Kendro Laboratory Products GmbH, Hanau (DE); Technologiezentrum GmbH - Rittergut Adelwitz, Arzberg (DE)

( * ) Notice: Subject to any disclaimer, the term of this patent is extended or adjusted under 35 U.S.C. 154(b) by 0 days.

(21) Appl. No.: 09/904,188

(22) Filed: Jul. 12, 2001

(65) Prior Publication Data

US 2002/0074882 A1 Jun. 20, 2002

Related U.S. Application Data

(60) Provisional application No. 60/244,922, filed on Nov. 2, 2000.

(30) Foreign Application Priority Data

| Jul. 13, 2000 | (DE) | ......................................... 100 34 204 |
| Apr. 25, 2001 | (DE) | ......................................... 101 20 623 |

(51) Int. Cl.[7] .............................................. H02K 7/09
(52) U.S. Cl. ..................................... 310/90.5; 505/166
(58) Field of Search .......................... 310/90.5; 505/166

(56) References Cited

U.S. PATENT DOCUMENTS

| 3,747,998 | A | * | 7/1973 | Klein et al. ................. 310/90.5 |
| 4,926,082 | A | * | 5/1990 | Barnes ....................... 310/90.5 |
| 5,227,066 | A | * | 7/1993 | Ishida et al. .............. 210/360.1 |
| 5,330,967 | A | * | 7/1994 | Takahata et al. ........... 310/90.5 |
| 5,341,059 | A | * | 8/1994 | Fukuyama et al. ......... 310/90.5 |
| 5,723,931 | A | * | 3/1998 | Andrey ....................... 310/179 |
| 6,608,417 | B1 | * | 8/2003 | Kozoriz ..................... 310/90.5 |
| 6,657,344 | B2 | * | 12/2003 | Post .......................... 310/90.5 |

FOREIGN PATENT DOCUMENTS

| DE | 19727550 A1 | * | 2/1998 | .......... F16C/32/04 |
| EP | 887569 A2 | * | 12/1998 | .......... F16C/39/06 |
| JP | 08226443 A | * | 9/1996 | .......... F16C/32/04 |
| JP | 10252754 A | * | 9/1998 | .......... F16C/32/04 |

* cited by examiner

Primary Examiner—Tran Nguyen
Assistant Examiner—J. Aguirrechea
(74) Attorney, Agent, or Firm—Baker & Hostetler LLP (57) ABSTRACT

A centrifuge with a rotor set-up having at least one magnetic bearing is invented to operate a novel centrifuge. The rotor arrangement is connected with at least one permanent magnet configuration which is radially separated by small gap from a passive superconducting magnet stator. The permanent magnets which are adjusted in such a way that the escaping magnetic flux penetrates the adjacent surface of the passive superconducting magnet stator at a substantially perpendicular orientation. A driving motor unit, preferably in the form of a contactless induction engine, ensures a free and frictionless rotation. The passive superconducting magnet stator is comprised a melt textured superconducting YBCO material of high critical current density which can be cooled below its critical temperature of T=92 K using an integrated cryogenic unit to obtain the superconducting state. The stator has a preferred shape of a cylinder or hollow cylinder.

24 Claims, 6 Drawing Sheets

CENTRIFUGE WITH A MAGNETICALLY STABILIZED ROTOR FOR CENTRIFUGAL GOODS

CROSS-REFERENCE TO RELATED APPLICATIONS

This application claims benefit of 60/244,922 filed Nov. 2, 2000.

The present application claims priority to German Patent Application Nos. 100 34 204.3 filed Jul. 13, 2000 and 101 20 623.2, filed Apr. 25, 2001, which applications are hereby incorporated by specific reference.

BACKGROUND OF THE INVENTION

1. The Field of the Invention

The present invention relates to centrifuges and, more specifically, centrifuges wherein a magnetic force levitates and stabilizes at least a portion of the rotor system thereof.

2. The Relevant Technology

From DT 23 14 436 A1 a bearing and a damping system is known for the stabilization of a fast rotating centrifuge. The rotor is guided stable in the position without a mechanical connection between the rotor and the surrounding. The stabilizing forces are magnetic in nature with an additional damping system produced by magnetic, mechanical-hydraulic, and hydropneumatic forces interacting with the rotor.

In this prior invention the combination and interaction of different damping factors and their coupling to the rotor is difficult to realize and requires an extremely high technical expense.

U.S. Pat. No. 5,196,748 discloses a laminated structure of a superconducting magnetic bearing. The reference discloses at least two permanent magnets in opposite polarity which are sandwiched causing a high magnetic flux density gradient and hence a high stiffness. The magnetic structure is inside a superconducting hollow cylinder.

Furthermore, DE 42 32 869 A1 discloses a superconducting bearing and a corresponding procedure for operation. The bearing system comprises a shaft encircled by permanent magnetic rings and a superconducting body, each of the elements being disposed within a housing. The superconducting body is shaped so that it is cooled down as the shaft is upwardly moved to a position where the rotating shaft is in balance between the weight of the shaft and the magnetic forces applied to the shaft by the interaction between the magnets and the superconductor.

The primary disadvantage of the above system is the complicated in-operation procedure whereby the rotor with the permanent magnets are located close to the superconductor following which a field frozen cooling down procedure is used to reach the superconducting stage. This standby procedure is less reproducible with respect to the rotor position and is a tedious pre-operation procedure.

BRIEF SUMMARY OF THE INVENTION

It is therefore an object of one embodiment of the present invention to design and construct a centrifuge and a method of use thereof so that during centrifugation the rotor is magnetically stabilized by one or two bearings and operates substantially free of mechanical contact and friction. It is a further object of one embodiment of the invention to use superconducting magnetic bearings to prevent or at least minimize the use and maintenance of the enormous electric and electronic circuit equipment of conventional active magnetic bearing designs.

In one embodiment, the material utilized for designing and constructing bearings is "high-temperature superconducting (HTS)", which has been shortened herein to "superconducting". Furthermore, the term "permanent magnet" is frequently abbreviated to "PM".

It is yet another object of one or more of the embodiments of the present invention to achieve high speed operation up to 180,000 RPM, substantial damping properties, low vibrating noise of the rotor shaft, and/or less driving power as well as safe operation with highly unbalanced rotor systems. A high bearing damping factor is desired at all operational frequencies. The damping should be independent of the actual speed.

The above objects are achieved in one embodiment with at least one permanent magnet configuration arranged at a distance in front of a passive superconducting magnet stator so as to produce an improved superconducting magnetic bearing.

Especially advantageous is the passive and self-stabilizing character of the bearing without any electronic control. As a result, the expenditure of the system is substantially reduced. The bearing allows a relative robust operation in experiment and processing.

In a preferred embodiment of the invention the permanent magnets are arranged so that the resulting magnetic flux distribution is directed almost normally to adjacent interacting surfaces of permanent magnets and superconductor.

In another preferred embodiment of the invention the rotor axis encircles an angel from 0 to 90 degrees relative to a horizontal plane.

In a highly preferred embodiment of the invention the rotor system has at least one ring or cylinder-shaped permanent magnet configuration and adjacent in radial direction a passive superconducting magnet stator.

In a first preferred embodiment of the invention the permanent magnet of the rotor is surrounded partly or totally by the superconducting stator element.

In a second preferred embodiment the permanent magnet configuration of the rotor concentrically surrounds the HTS magnet stator.

The rotor design advantageously consists of one PM configuration which at least in the axial direction is adjacent to at least one passive superconducting magnet stator. In another embodiment the permanent magnet configuration is attached on a shaft or a shaft-shaped part along the rotor axis. In the case of a multiple bearing design, at least one stator surrounds the shaft or part of the shaft.

In a further preferred embodiment of the centrifuge the permanent magnet configuration is fixed in a hollow cylinder-shaped shaft of the rotor or is designed as a hollow cylinder-shaped shaft. For more than one bearing, the hollow shaped shaft surrounds at least one stator.

The present invention also envisions a combination with a rotor arrangement with at least one PM configuration which is radially directed adjacent to a superconducting magnet stator and in addition is simultaneously adjacent to an axial magnet stator.

In a further preferred embodiment the passive superconducting magnet stator is connected with a cryogenic unit. The stator is at least partly shaped as a hollow cylinder. In one embodiment, the stator is a monolithic hollow cylinder of melt textured YBCO material with a critical temperature of 92 K equivalent −181° C. The preferred stator material is polycrystalline melt textured material of the composition $Y_{13-17}Ba_2Cu_3O_{7-\delta}$. The material shows a multi-domain magnetic structure with advantageous damping properties produced by the material grain boundaries for the magnetic bearing.

In an additional preferred embodiment the stator includes damping rings of copper, aluminum or alloys thereof. The damping devices can either be sandwiched and thermally connected between individual superconductors or fitted into the superconducting components.

The superconducting magnet stator is connected with a cryogenic engine inside the centrifugal housing in order to cool down the superconductor below its critical temperature. Alternatively, the superconductor can be cooled in an economical way by liquid Nitrogen to a temperature of 77 K or equivalent −196° C.

In an alternative embodiment at least a portion of the superconducting magnet stator has a hollow cylinder or a ring shape with at least one lateral open segment or sector window.

The permanent magnet configuration in one embodiment has a ring or cylinder shape and is arranged coaxially with respect to the rotor axis.

According to another embodiment the permanent magnet configuration comprises as a ring or cylinder shaped PM. A plurality of co-axial rings and hollow cylinders are stacked directly or with another material therebetween in radial and/or axial direction.

One preferred embodiment of the centrifuge has a PM configuration comprising axial magnetized rings stacked or sandwiched in axial direction so that adjacent magnet surfaces are magnetized to the same polarity. As a result of the equation of continuous magnetic flux flow the desired high magnetic flux density expands radially of the rotatable member.

According to another embodiment of the centrifuge, at least two annular PM's are coaxially fitted one in another in a common plane whereby the outer diameter of the smaller ring touches the inner diameter of the larger ring. The rings can be repulsive or attract each other by having adjacent PM faces either in the same or opposite axial polarity.

In a useful embodiment the permanent magnet configuration is mounted directly in the lower part of the rotor cup.

For the PM configuration at least one annular or cylindrical shaped magnet is typically needed.

In a further preferred embodiment the stator comprises at least one cylindrical finger made from aluminum or copper that is surrounded by and thermally connected to a hollow cylinder of superconducting material. The superconducting finger provides a stable magnetic interaction and levitation with the PM rings positioned inside the rotatable drive shaft.

In a first preferred embodiment of the novel centrifuge, the drive shaft with a driving motor system carries at least one pair of axially stacked PM's. The magnets are arranged along the rotational axis in spaced apart groups. The PM groups are radially surrounded by superconducting magnet stator elements.

The drive shaft has a hollow shaped geometry because of weight and is fabricated from a material of high ultimate tensile strength. The material typically includes a metal or alloy comprised of aluminum, steel, titanium and/or carbon fiber composite whereby the ratio of tensile strength to density is typically in a range from about $10^6$ Pa cm$^3$/g to about $3\times10^9$ Pa cm$^3$/g.

The drive shaft of this embodiment is connected with annular PM's producing a radial flux distribution. The radial flux distribution is created either by axially magnetized PM rings stacked in groups in repulsive geometry with a high permeable, magnetic flux collecting and guiding material interposed therebetween or by radially magnetized annular PM's.

In a further preferred embodiment the permanent magnet configuration is utilized simultaneously for the bearing function as well as the wheel driving motor function. Alternatively, the driving function can be due to a standard induction motor.

In a further preferred embodiment the superconducting magnet stator is modified so that copper rings are interposed between the superconducting cylinders. This positioning of the copper rings provides additional damping of the bearing by speed dependent eddy currents which increase the temperature of both the Cu rings and the adjacent HTS stator material slightly. The gap between the superconducting stator and the annular PM's is typically between about 1 mm to about 5 mm.

The drive shaft has a mechanical emergency bearing at its lower part. The emergency bearing stabilizes the rotor part during the cool-down procedure of the superconductor or in the initial and final phase of the centrifugal operation at low speeds.

In a further preferred embodiment of the invention the housing is positioned at the upper end of the vertical rotor with at least two annular or cylindrical PM's mounted on the shaft. Adjacent axial arranged passive superconducting magnets control the stabilizing magnetic forces in the axial direction. In contrast to the first embodiment, here the levitation forces are substantially axially directed.

Practically, the superconducting magnets are shaped as a ring or a hollow cylinder whereby the gap between rotor and stator can be closed by a thin isolation wall. In this configuration, the drive shaft together with permanent magnet rings rotate in a warm bore separated from the cold superconductors. The axial distance between each group of stacked PM's correlates with the distance of the superconductors. The practical minimum distance between the stacked PM's due to the magnetic interaction is about 5 mm. Increasing the distance between the double bearings along the drive shaft improves the tilt stiffness of the rotor.

Advantageously, the unbalance stability in a double-bearing centrifuge is improved when the gap between the PM and the superconductor is larger in the upper bearing near the centrifugal rotor compared to the gap distance in the lower bearing. This combination of different stiffnesses of the two bearings is able to control substantially large unbalanced masses relative to the state of the art of the centrifugal technique.

In a third preferred embodiment of the invention a rotor design includes a drive shaft having at one end thereof a hollow shaped cylinder. At least one permanent magnet ring or cylinder is disposed inside the hollow shaped cylinder. Centrally disposed within the permanent magnet is a passive superconducting magnet stator. The stator is concentrically arranged on a cooling finger and is connected to a cooling unit. The hollow shaft cylinder has at the outside a pole structure of an induction motor as a driving unit.

In a preferred fourth embodiment of the invention the rotor comprises a plurality of annular permanent magnets arranged in-plane as an integrated rotor part. Concentrically therewith and spaced apart therefrom, the superconductor magnet is positioned adjacent to the lower face of the PM configuration. The annular magnets are axially magnetized with equal polarities leading to a flux distribution parallel to the rotor axis and perpendicular to the neighboring functional faces. The magnet rings are in a repulsive position. Due to the magnet superconductor interaction and the pinning effect, the rotor is levitated at a certain distance from the bearing stator. The annular magnets have one degree of freedom to rotate contactless and almost frictionless. The driving system can also be contactless, e.g., due to an axial multi-pole induction motor.

Another preferred embodiment is a plane-like axial bearing with at least two concentrically and coaxially arranged PM rings fitted within each other equivalent to the geometry above. However, the magnetization of adjacent magnet ring surfaces has a different polarity and the fitted annular magnets are in an attracting position. Due to the high magnetic gradient in radial direction, the plane-like bearing is especially stiff for radial rotor displacement. The rotatable part is disposed above the plane-like cylindrical superconductor. Furthermore, by using "freezing," a quantity of the magnetic flux penetrated into the superconductor is trapped there by effective pinning centers in the material. The rotor system is stabilized by repulsive and attractive magnetic forces in an equilibrium state above the superconductor.

Finally, the present invention also includes a flat centrifuge design with a high load capacity and simultaneously high angular stiffness. One solution is the double-bearing system described above. Another solution utilizes a flat YBCO ring with a size of about 100 mm to about 400 mm in diameter with one or more PM rings inside or outside the superconductor. The annular rings carry the rotor in this single-bearing design. The resulting configuration is extremely stable and comprises a highly compact centrifuge construction.

BRIEF DESCRIPTION OF THE DRAWINGS

The following preferred embodiments of the invention are discussed below with regard to FIGS. 1 to 9 in which.

DETAILED DESCRIPTION OF THE PREFERED EMBODIMENTS

Figure 1:
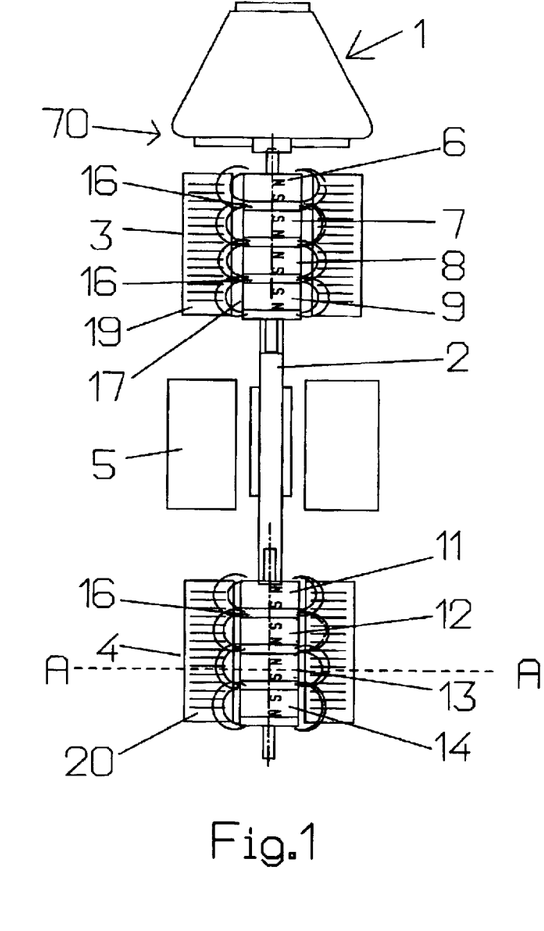
FIG. 1 shows a vertical rotor schematically that is stabilized by two radial bearings with magnets and superconductor hollow cylinders arranged and spaced along the symmetry axis.

Referring to FIG. 1, a rotor 1 is connected at an upper part of a vertical drive shaft 2. Rotor 1 and drive shaft 2 form one embodiment of a rotor assembly 70. Drive shaft 2 has a longitudinal axis 21 and is rotable by two superconducting magnetic bearings 3 and 4 that are axially separated along the length of drive shaft 2. A driving unit 5 is located between bearings 3 and 4.

Each of bearings 3 and 4 has ring or cylinder shaped permanent magnets. Specifically, bearing 3 includes permanent magnets 6, 7, 8, and 9 fixed to drive shaft 2 while bearing 4 includes permanent magnets 11, 12, 13, and 14 fixed to drive shaft 2. The above groups of permanent magnets are examples of permanent magnet configurations. At least one passive superconducting magnet stator 19 surrounds permanent magnets 6–9. Stator 19 and permanent magnets 6–9 are separated by a gap 17. Similarily, at least one passive superconducting magnet stator 20 surrounds permanent magnets 11–14. Stator 20 and permanent magnets 11–14 are also separated by a gap 17.

A corresponding disc 16 of highly permeable material is disposed between permanent magnets 6 and 7, 7 and 8, 8 and 9, 11 and 12, 12 and 13, 13 and 14, respectively. Discs 16 guide the magnetic flux from the original axial direction along the length of drive shaft 2 into a radial direction. The magnetic flux crosses gap 17 between stator 19 and permanent magnets 6–9 and penetrates perpendicular into the adjacent superconducting magnet stator 19.

The annular permanent magnets 6–9 as well as 11–14 are typically made from SmCo or NdFeB and provide a stable rotor position by means of flux pinning relative to small displacements in axial or radial direction. The frozen trapped annular magnet field distribution in the superconductor enables one degree of freedom around the longitudinal axis 21 of drive shaft 2. As a result, drive shaft 2 and rotor 1 can rotate without friction. Permanent magnets 6–9 and 11–14 at high speed operation are stressed by dynamic forces in terms of the d'Alembert principle. Due to these dynamic centrifugal and tangential forces, in one embodiment an arming of permanent magnets 6–9 and 11–14 is applied using high strength carbon fiber composites including prepreg resin.

Advantageously, the stacked permanent magnet configuration on drive shaft 2 together with the well textured YBCO hollow cylinder provides maximum forces whereby the combination of a plurality of annular magnets in repulsive and attractive position enhance both the absolute flux density as well as the gradient of the magnet flux in radial direction.

Figure 2:
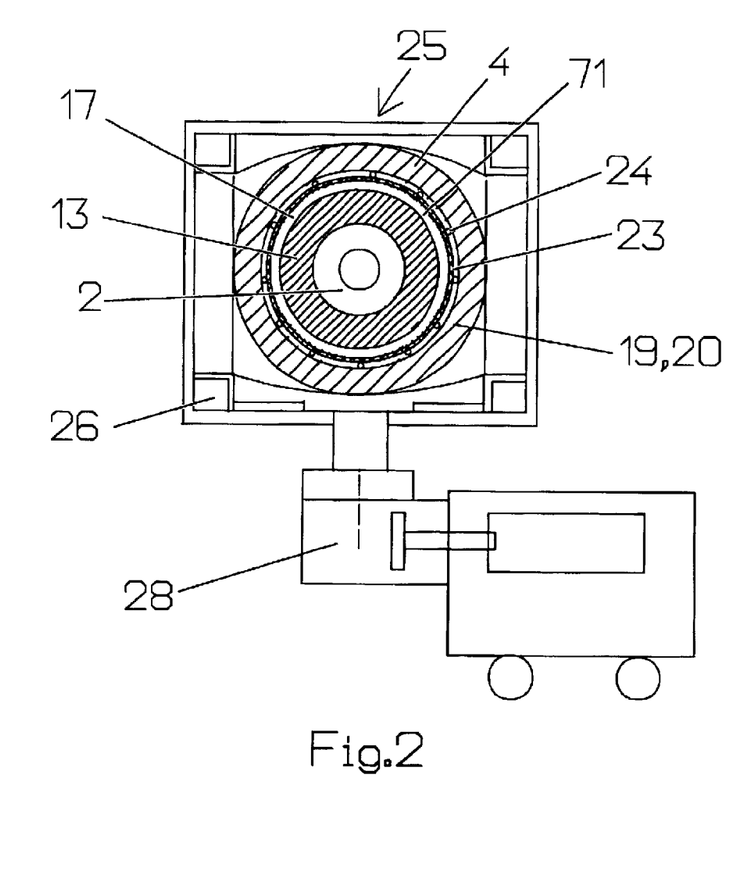
FIG. 2 displays a cross section of the driving shaft and the lower magnetic bearing of FIG. 1

Depicted in FIG. 2, the cross section of magnetic bearing 4 along a line A—A (FIG. 1) enables a detailed study of the system. The centrifuge bearing 4 includes passive superconducting magnet stator 20 disposed within a housing 25. Superconducting magnet stator 20 is thermally isolated due to an evacuated environment within housing 25. A thin cylindrical wall 23 supported by spacers 24 of low thermal conductivity bounds a warm bore 71 in which permanent magnets 11–14 are disposed. Cylindrical wall 23 also functions to separate permanent magnets 11–14 from the cold stator 20. Furthermore, the bearing 4 is provided with the so-called warm bore 71, to enable exchange of the rotor system without loosing superconductivity.

A cold head 28 is connected with the superconducting magnet stator 20 to lower the stator temperature and provide the superconducting state. The cooling performance is obtained either by a liquid Nitrogen cryostat or by a small crycooler engine, e.g., a Stirling cooler. Furthermore, in the housing 25 of the stator 20 special copper areas are selected to deposit active carbon material 26. During cooling of the stator 20 via its housing 25, the carbon material 26 functions as a small cryo-pump in order to improve the isolation vacuum around the stator intrinsically. Inside the stator device 20, drive shaft 2 is shown together in a cross sectional view with the permanent magnets, e.g. magnet 13. Drive shaft 2 of the centrifuge is hollow or tubular because of weight and rotates in the superconducting rings or cylinders of superconducting magnet stator 20.

Figure 3A:
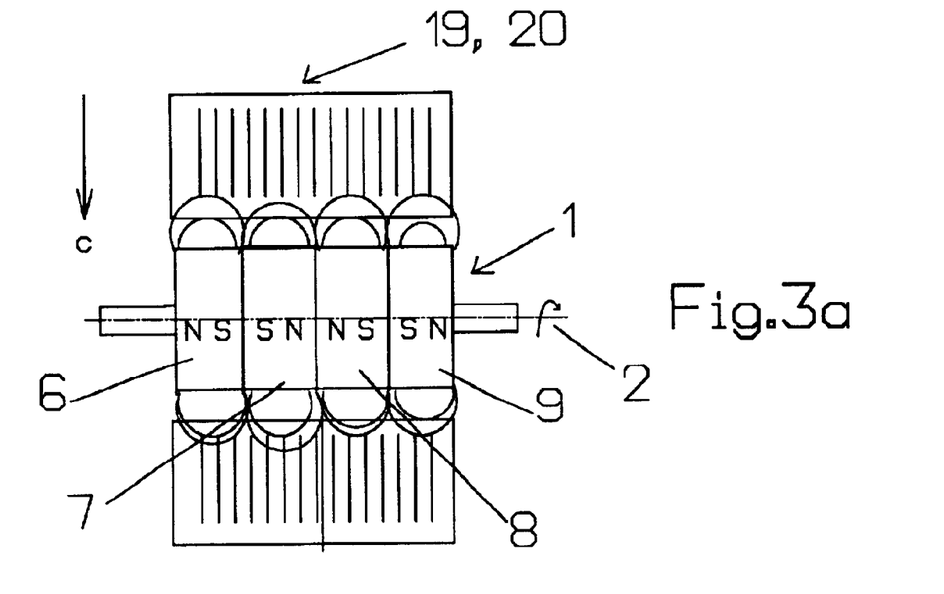
FIGS. 3a and 3b illustrate the opposite polarity magnet configuration with and without flux guiding density collectors of high permeable material between the magnets.

Depicted in FIG. 3a, the permanent magnets 6–9 of bearing 3 are sandwiched together so that opposing faces are directly biased together. The magnetic flux of the permanent magnets escapes radially at the boundary face between two magnets. The sandwiched permanent magnets produce a relatively higher flux density, i.e., close to a factor of two relative to the flux density of a single permanent magnet. The exponential flux decay, however, limits the typical size of gap 17 between stator 19 and permanent magnets 6–9 to a range between about 2 mm to about 5 mm. A larger size of gap 17 generates a relatively weak magnetic flux pinning in the stator 19. A small sized gap 17, typically 0.5 mm, provides a larger pinning force. Permanent magnets 11–14 and stator 20 of bearing 4 can be similarly configured.

Figure 3B:
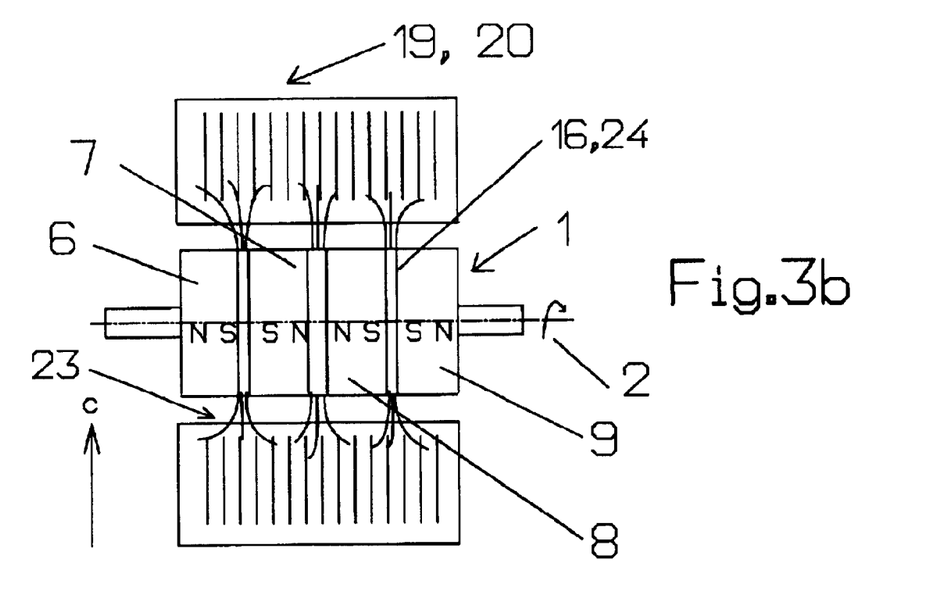

In an alternative embodiment depicted in FIG. 3b, a substantial improvement is obtained by stacking permanent magnets 6–9 axially but with high permeable annular discs 16 therebetween. Discs 16 have cross section comparable to the magnet rings 6 to 9 and a thickness in a range between about 1 mm to about 2 mm and function to collect and guide the magnetic flux. The magnetic flux expands radially through gap 17 between stator 19 and permanent magnets 6–9 and penetrates nearly perpendicular into superconducting magnet stator 19.

A material melt texturing process statistically provides an orientation of the individual YBCO crystals of the cylinder-like superconducting magnet stator 19, e.g. the crystallographic a–b planes are located in the cylinder wall and the c-axis looks radially and parallel to the direction of the magnetic flux. The background for this embodiment is the anisotropic behavior of the superconducting YBCO crystals. This preferred orientation causes very high screening currents in the superconductor and hence strong magnetic interaction forces. Accordingly, by decreasing the width of gap 17 to a range between about 1 mm–2 mm, e.g., by precise fabricating and machining of the bearing stator 19, an extremely high bearing stiffness and position stability of the rotor at all rotational speeds can be obtained.

In this context in FIG. 3a and the following FIG. 3b the cylinder-like configuration and the preferential crystallographic c direction is indicated by an arrow C in particular to excite high critical screening currents and hence large magnetic forces.

Between the annular permanent magnets, discs 16 of permeable material, which typically have a thickness of 1 mm–2 mm, are laminated for guiding the magnetic flux in the optimal direction crossing the rotor-stator gap 17 and penetrating nearly perpendicular into the wall of superconducting cylinder stator 19, 20. Depicted in FIGS. 1 and 3b the flux guiding discs 16 are periodically and intermediately arranged between the PM's 6, 7, 8, and 9 of bearing stator 19 and are similarly arranged between PM's 11 to 14 of bearing stator 20. The magnetic flux in the resulting configuration penetrates substantially perpendicular into the inner wall 23 of the stators 19 and 20. There the flux generates a virtually aligned radial magnetization in the superconductor by the permanent magnets which are fastened at the shaft 2 in an axial periodicity to utilize the material available and cause a maximum stable and magnetic interaction. By decreasing the width of gap 17 to about 1–2 mm between the PM's of the driving shaft 2 (rotor 1) and the stators 19 and 20, which is achievable by precision machining of the stator, load capacity and stiffness are increased and a high position stability at all rotational speeds is provided.

Figure 4:
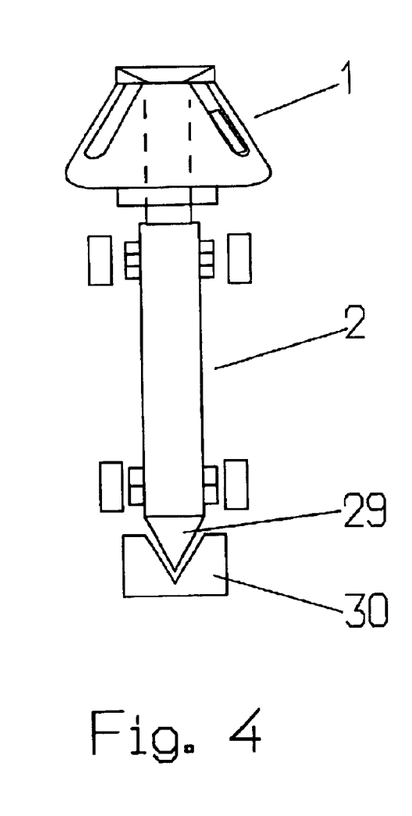
FIG. 4 illustrates the basic magnet bearing configuration with an additional emergency bearing.

FIG. 4 shows schematically a superconducting magnetic double bearing with a cross section view along the rotor 1 and the drive shaft 2. The lower part 29 of the driving shaft 2 ends in an emergency bearing 30. This configuration is especially valuable in the case of spinning unbalanced rotors with an initial dynamic set-up procedure to optimize the rotational properties of the bearings. The emergency bearing 30 holds the shaft 2 with rotor 1 in central position as long as no magnetic forces are applied to stabilize the centrifuge. Utilizing the emergency bearing, the "freezing" of the magnetic field during cooling down is performed under dynamic conditions at low rotations, thereby ensuring an averaged homogeneous field trapping in the stator. By accelerating the centrifuge to higher speeds, a small clearance is created between the emergency bearing 30 and the shaft 2, thereby creating a contact free magnetic stabilization and rotation of the shaft 2.

Figure 5:
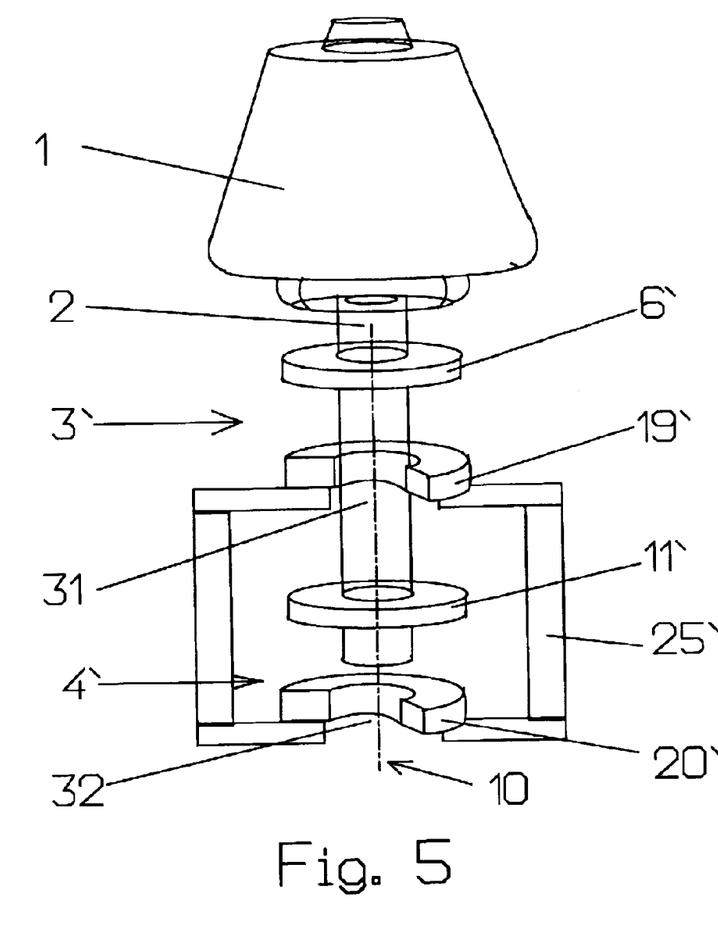
FIG. 5 shows a vertical superconducting magnetically stabilized centrifuge design whereby the rotor is replaceable.

An alternative example of a centrifugal design is shown in FIG. 5. A rotor 1 is located at the upper end of a drive shaft 2 having a vertical axis 10. The centrifuge includes two magnetic bearings 3' and 4'. Each of magnetic bearing 3' and 4' has a corresponding permanent magnet 6', 11', respectively, secured to drive shaft 2. Drive shaft 2 can be inserted in a housing 25' perpendicular to its rotational axis 10. In the housing, two passive superconducting magnet stators 19', 20' are provided having a central opening or sector window 31, 32, respectively. Sector windows 31 and 32 enable a lateral insertion of drive shaft 2 through stators 19', 20'. The magnet stators 19', 20' are cooled by a connected head of a small cooling engine already described in FIG. 2. Alternatively, the superconducting magnet stators 19', 20' can be brought into their superconducting state by a liquefied gas, e.g., liquid Nitrogen ($LN_2$).

The position of the permanent magnets 6', 11' and the magnet stators 19', 20' are correlated to maximize their interaction. Once drive shaft 2 is inserted into housing 25', a housing clamp (not shown) is fixed to drive shaft 2. The housing clamp is used to prevent drive shaft 2 from accidentally coming out of housing 25' if superconductivity is lost. To improve emergency rotation properties of drive shaft 2, an emergency bearing, such as emergency bearing 30 discussed above with regard to FIG. 4, can be positioned at the lower end of drive shaft 2.

Figure 6:
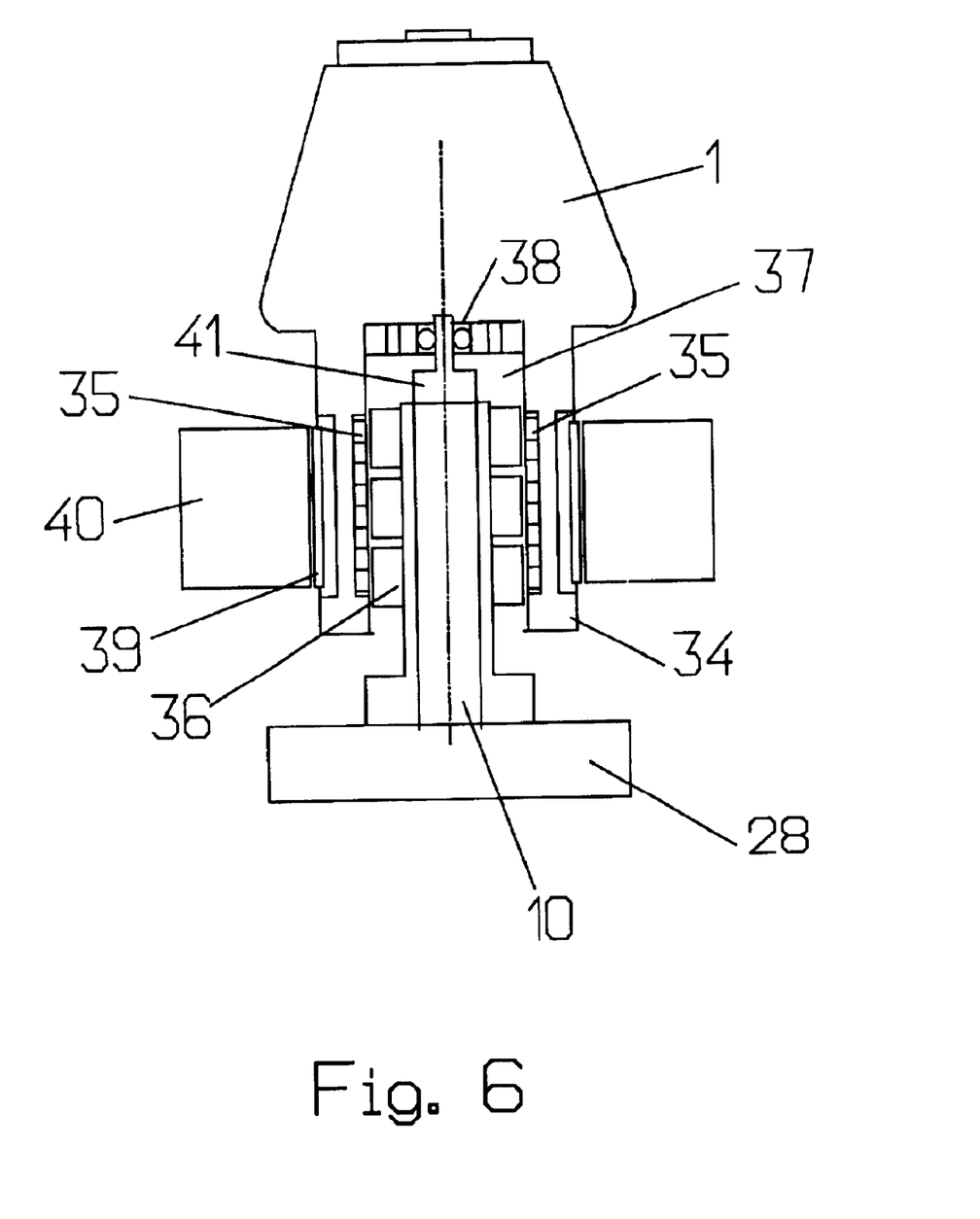
FIG. 6 shows schematically a single bearing centrifuge.

In FIG. 6 a so called external rotor 1' is shown. The rotor 1' is designed at its lower part with a hollow cylinder 34. Rotor 1' and cylinder 34 form one embodiment of a rotor assembly. Disposed within hollow cylinder 34 is at least one ring or cylinder shaped PM 35. Hollow cylinder 34 together with the permanent magnets 35 concentrically surround a passive superconducting magnet stator 36. Centrally disposed within magnet stator 36 is a metallic shaft 41. An upper end 37 of metallic shaft 41 goes into a mechanical emergency bearing 38 of the rotor 1'. In one embodiment, metallic shaft 41 consists of a material having a high linear thermal extension coefficient, preferably aluminum or steel. Due to the cooling down procedure of superconducting magnet stator 36, metallic shaft 41 is simultaneously thermally contracted, thereby giving a small clearance to the emergency bearing 38 while the rotor is fixed magnetically. Positioned at the outer periphery of the hollow cylinder 34, an induction motor 40 is part of the contactless driving unit.

The other stator part of the motor 40 is suitable to drive and control the dynamic properties of the centrifuge. Because of clear demonstration the cryogenic unit 28 is omitted. The cooling system corresponds essentially to the embodiment in FIG. 2.

Figure 7:
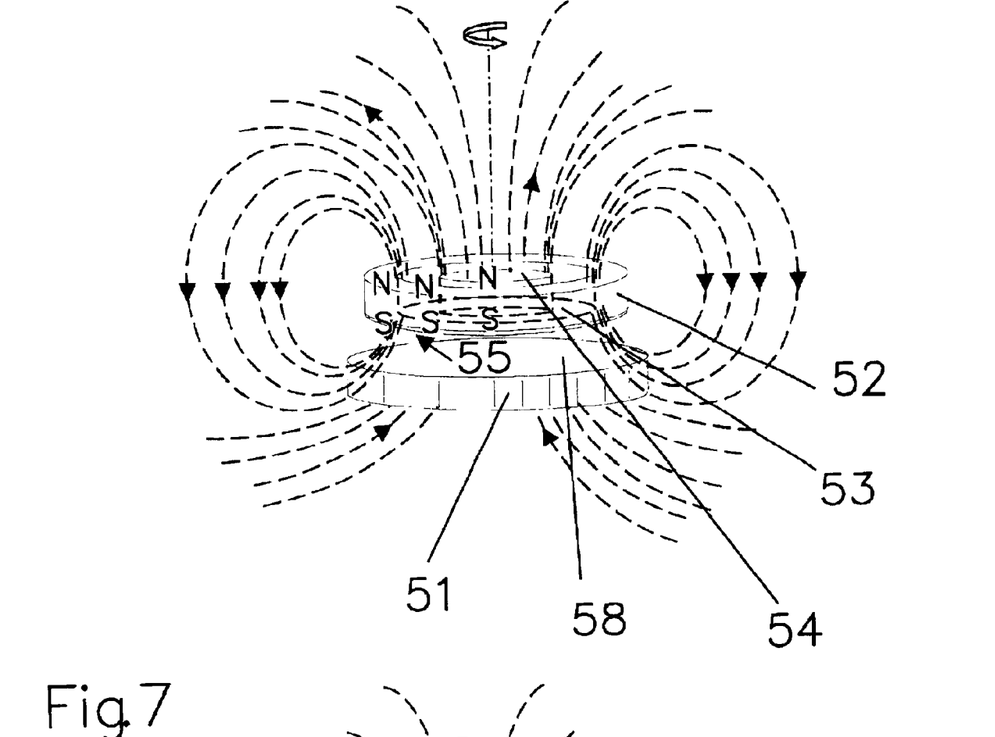
FIG. 7 illustrates a axial magnetic bearing configuration having concentric and coplanar magnet rings axially magnetized in repulsive geometry with homopolar neighboring (N—N, S—S) and a superconductor spaced apart from the magnets.
Figure 8:
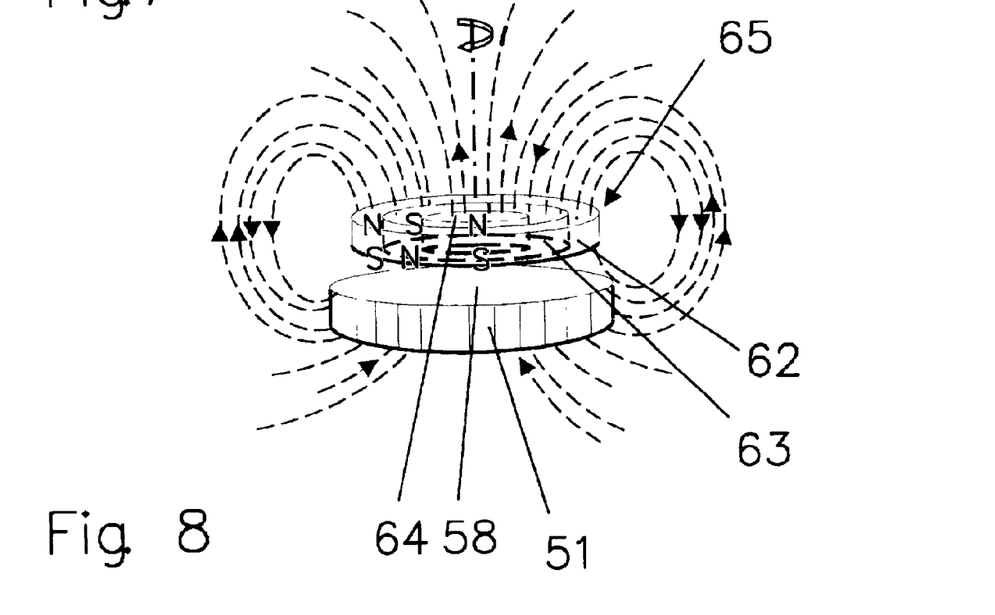
FIG. 8 illustrates the same configuration of a passive magnetic bearing of FIG. 7, however the magnets are heteropolar adjacent arranged (N-S, S-N)
Figure 9:
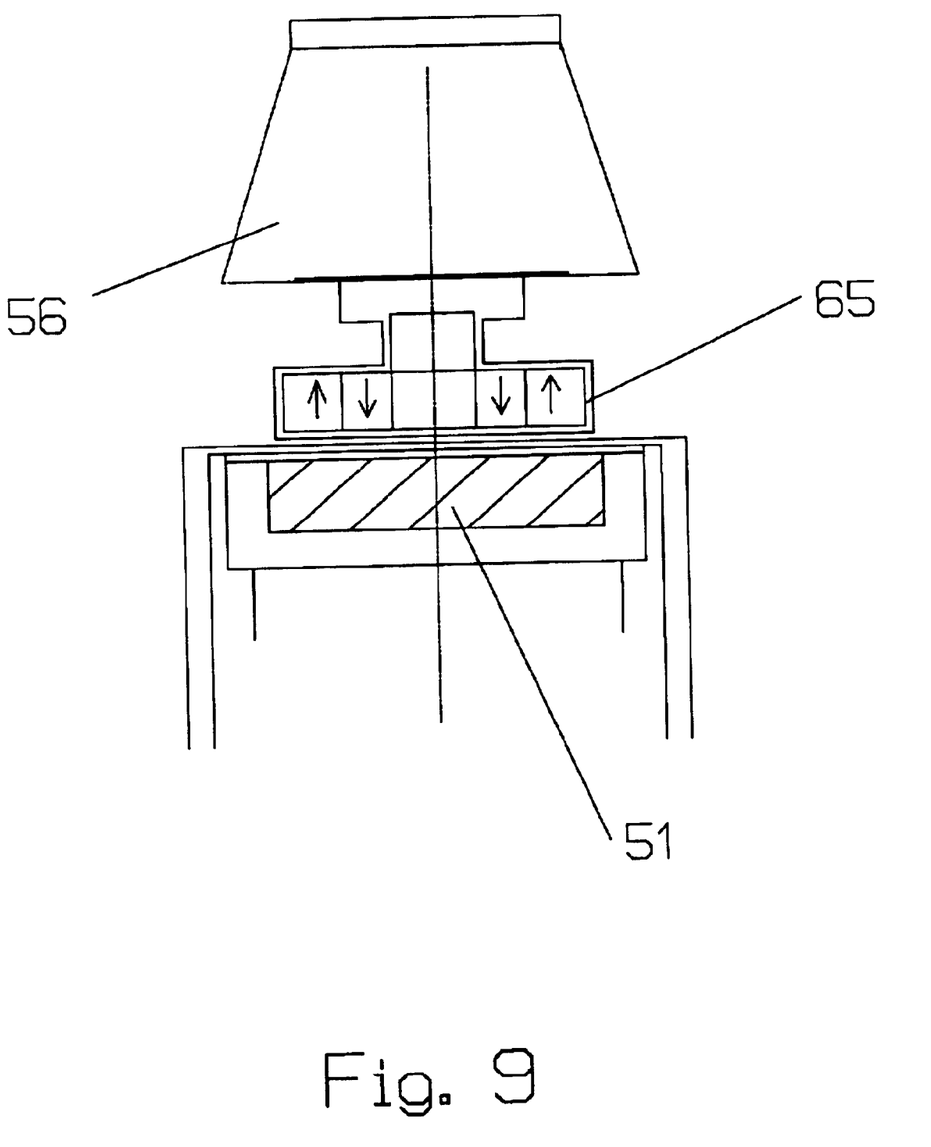
FIG. 9 shows schematically an centrifugal design referring to the magnet configuration of FIG. 8

Depicted in FIGS. 7–9 is a disc shaped superconducting magnet stator 51 connected with a cryogenic unit in a centrifugal housing. Positioned a distance above the superconductor 51 is a permanent magnet configuration 55. Permanent magnet configuration 55 includes three axial magnetized PM's 52, 53, 54 fitted each in another in a coaxial and coplanar geometry. This configuration gives a favorable magnetic distribution for use in a bearing. The PM's are mounted in the plane in a repulsive position. That is, each permanent magnet has the same polarity at the same surface, e.g., the upper faces show the north pole the lower faces show the south pole. PM configuration 55 is also part of the rotor system not shown here. The field distribution in FIG. 7 indicates an equally axially directed magnetization with alternating annular high dense magnetic field distribution and lower field areas. The summarized field distribution enters the adjacent surface of a passive superconducting plane stator 58 nearly perpendicular and generates the screening superconducting current.

Depicted in FIG. 8 is a permanent magnet configuration 65 including permanent magnets 62, 63, 64 concentrically disposed in the same plane. In contrast to the embodiment in FIG. 7, however, the axial surfaces of radial neighboring rings show alternating polarities NSN or SNS as it is indicated for the PM 62 (north) adjacent to the PM 63 (south) and PM 64 (again north). This alternating polarity generates strong flux density gradients entering the superconducting neighboring surface perpendicular. Again the PM configuration is an integrated part of the rotor set-up.

When necessary the permanent magnet configurations of FIGS. 7 and 8 are exchangeable and replaceable for different rotor set-ups.

FIG. 9 shows a single bearing embodiment of the invention schematically according to the construction of FIG. 8. The embodiment includes an annular permanent magnet configuration 65 of two magnet rings and one magnet disc connected with the lower part of the rotor housing 56. The superconducting magnet stator 51 is located at a small distance below the PM configuration 65 open or thermally isolated from the rotor space.

What is claimed is:

1. A centrifuge comprising:
    a rotor assembly rotatable about a rotor axis, the rotor assembly being configured to hold materials for separation;
    a first superconducting magnetic bearing comprising;
    a first permanent magnet configuration coupled with the rotor assembly so as to rotate concurrently with the rotor assembly; and
    a passive first superconducting magnet stator being spaced apart from the first permanent magnetic configuration and the rotor assembly, the first superconducting magnet stator and first permanent magnet configuration being sufficiently close together to produce a magnetic field interaction therebetween; and
    a motor coupled with the rotor assembly for selectively rotating the rotor assembly,
    wherein the first permanent magnet configuration comprises an integrated lower part of the rotor assembly and wherein the first permanent magnet configuration comprises a first permanent magnet concentrically disposed within a second permanent magnet.

2. A centrifuge according to claim 1, wherein magnet field lines of the first permanent magnet configuration penetrate approximately perpendicular into at least one surface of the first superconducting magnet stator.

3. A centrifuge according to claim 1, wherein the position of rotor axis includes an angle from 0 to 90 degrees relative to a horizontal plane.

4. A centrifuge according to claim 1, wherein the first permanent magnet configuration comprises at least one permanent magnet ring or a permanent magnet cylinder, the first superconducting magnet stator being at least partially disposed in radial alignment with the first permanent magnet configuration.

5. A centrifuge according to claim 4, wherein the first superconducting magnet stator at least partially surrounds the first permanent magnet configuration.

6. A centrifuge according to claim 4, wherein the first permanent magnet configuration at least partially surrounds the first superconducting magnet stator.

7. A centrifuge according to claim 1, wherein:
    the rotor assembly comprises a rotor mounted on a drive shaft; and
    the first permanent magnet configuration comprises a plurality of discrete permanent magnets, each permanent magnet being disposed at a discrete location along the length of the drive shaft, the first superconducting magnet stator encircling the drive shaft.

8. A centrifuge according to claim 1, wherein:
    the rotor assembly comprises a rotor cup having a substantially cylindrical housing projecting therefrom, the cylindrical housing having an inside face and an outside face; and
    the first permanent magnet configuration comprises a plurality of discrete permanent magnets, each permanent magnet being disposed at a discrete location on the inside face of the cylindrical housing along the length thereof, at least a portion of the first superconducting magnet stator being disposed within the cylindrical housing.

9. A centrifuge accordingly to claim 1, wherein the first permanent magnet configuration comprises:
    a plurality of discrete permanent magnets; and
    a collector ring disc disposed between each of the permanent magnets.

10. A centrifuge according to claim 1, wherein the first superconducting magnet stator is connected to a cryogenic unit configured to cool the first superconducting magnet stator.

11. A centrifuge according to claim 10, wherein the first superconducting magnet stator is coupled directly to an in-housing integrated cryogenic unit to cool down the first superconducting magnet stator to below the critical temperature and to maintain the superconducting state.

12. A centrifuge according to claim 10, wherein the first superconducting magnet stator has a substantially solid or hollow cylindrical configuration.

13. A centrifuge according claim 12, wherein first superconducting magnet stator is comprised of a melt textured YBCO superconducting material of the composition $Y_{1.3-1.7}Ba_2Cu_3O_{7-\delta}$, wherein the material below T=92 K becomes superconducting.

14. A centrifuge according to claim 1, wherein first superconducting magnet stator comprises a melt textured multi-grain material of high mechanical stability configured to produce damping properties of the magnetic bearing.

15. A centrifuge according to claim 14, wherein the first superconducting magnet stator comprises a ring-shaped damping discs made from copper, aluminum or their basic alloys.

16. A centrifuge according to claim 1, further comprising:
   a passive second superconducting magnet stator; and
   a damping disc interposed between the first and second superconducting magnet stator, the damping disc being formed from copper, aluminum or their basic alloys.

17. A centrifuge according to claim 1, wherein the first superconducting magnet stator has the geometry of a ring or hollow cylinder.

18. A centrifuge according to claim 1, wherein first permanent magnet configuration comprises at least one permanent magnet a substantially ring or cylinder like shape, the permanent magnet being mounted coaxially about the rotor axis.

19. A centrifuge according to claim 1, wherein the first permanent magnet configuration comprises a plurality of axial magnetized rings stacked axially with adjacent equal polarities and comprising a high radial magnet flux density.

20. A centrifuge according to claim 1, wherein the first permanent magnet configuration comprises a single ring or cylinder like permanent magnet.

21. A centrifuge according to claim 1, further comprising:
   a second superconducting magnetic bearing spaced apart from the first superconducting magnetic bearing, the second superconducting magnetic bearing comprising:
   a second permanent magnet configuration coupled with the rotor assembly so as to rotate concurrently with the rotor assembly; and
   a passive second superconducting magnet stator being spaced apart from the second permanent magnetic configuration and the rotor assembly, the second superconducting magnet stator and first permanent magnet configuration being sufficiently close together to produce a magnetic field therebetween.

22. A centrifuge comprising:
   a rotor assembly rotatable about a rotor axis, the rotor assembly being configured to hold materials for separation;
   a first superconducting magnetic bearing comprising:
   a first permanent magnet configuration coupled with the rotor assembly so as to rotate concurrently with the rotor assembly; and
   a passive first superconducting magnet stator being spaced apart from the first permanent magnetic configuration and the rotor assembly, the first superconducting magnet stator and first permanent magnet configuration being sufficiently close together to produce a magnetic field interaction therebetween; and
   a motor coupled with the rotor assembly for selectively rotating the rotor assembly,
   wherein the first permanent magnet configuration comprises an integrated lower part of the rotor assembly and wherein the first permanent magnet configuration comprises at least two annular permanent magnets mounted concentrically one in another in a plane whereby the rings are radially adjacent fitted.

23. A centrifuge according to claim 22, wherein in the radial direction the upper surfaces of neighboring rings show equal or alternating axial magnetization.

24. Centrifuge with a rotor unit to process and separate different dense materials has at least one bearing and is combined with a driving device rotatable around the rotor axis, wherein at least one part of the rotor unit is influenced by magnetic forces and is characterized in that the rotor arrangement comprises at least one permanent magnet configuration which interacts at given small distance with at least one adjacent superconducting magnet stator wherein the permanent magnet configuration and the magnet stator comprise at least one passive superconducting magnetic bearing and wherein the permanent magnet configuration comprises an integrated lower part of the rotor unit, wherein first permanent magnet configuration comprises a first permanent magnet concentrically disposed within a second permanent magnet.

* * * * *